(12) United States Patent
Drouhault et al.

(10) Patent No.: US 9,337,500 B2
(45) Date of Patent: May 10, 2016

(54) FUEL CELL WITH IMPROVED THERMAL MANAGEMENT

(75) Inventors: Delphine Drouhault, Barberaz (FR); Pierre Nivelon, Saint Hilaire du Touvet (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 232 days.

(21) Appl. No.: 14/119,143

(22) PCT Filed: May 24, 2012

(86) PCT No.: PCT/EP2012/059755
§ 371 (c)(1),
(2), (4) Date: Nov. 20, 2013

(87) PCT Pub. No.: WO2012/160162
PCT Pub. Date: Nov. 29, 2012

(65) Prior Publication Data
US 2014/0106253 A1    Apr. 17, 2014

(30) Foreign Application Priority Data
May 26, 2011    (FR) ..................... 11 54607

(51) Int. Cl.
H01M 8/04      (2006.01)
H01M 8/24      (2016.01)
H01M 8/10      (2016.01)

(52) U.S. Cl.
CPC ...... *H01M 8/04074* (2013.01); *H01M 8/04029* (2013.01); *H01M 8/04067* (2013.01);
(Continued)

(58) Field of Classification Search
CPC ..................... H01M 8/04417; H01M 8/04358; H01M 8/04074; H01M 8/04067; H01M 8/04029
See application file for complete search history.

(56) References Cited

U.S. PATENT DOCUMENTS 6,544,085 B1 * 4/2003 Menard et al. .............. 440/88 C
2002/0192521 A1  12/2002 Raiser et al.
(Continued)

FOREIGN PATENT DOCUMENTS

CN    1297259 A    5/2001
CN    1405917 A    3/2003
(Continued)

OTHER PUBLICATIONS

International Search Report Issued Aug. 21, 2012 in PCT/EP12/059755 Filed May 24, 2012.
(Continued)

*Primary Examiner* — Patrick Ryan
*Assistant Examiner* — Wyatt McConnell
(74) *Attorney, Agent, or Firm* — Oblon, McClelland, Maier & Neustadt, L.L.P.

(57) ABSTRACT

A fuel cell including at least two stacks of electrochemical cells, a heat management system including a circuit for flowing a coolant into each of the stacks fed in parallel, and an outside circuit for flowing the coolant outside the stacks. The outside circuit includes a first subcircuit including a heat exchanger and a second subcircuit directly connected to an inlet of the inside circuit, and controlling valves for controlling flow of the coolant toward either or both subcircuits as a function of temperature of the coolant at an output of each of the stacks. The second outside subcircuit includes a mechanism increasing its head loss such that it is close or equal to that of the first outside subcircuit.

14 Claims, 3 Drawing Sheets

(52) U.S. Cl.
CPC .......... *H01M8/04768* (2013.01); *H01M 8/248* (2013.01); *H01M 8/249* (2013.01); *H01M 2008/1095* (2013.01); *Y02E 60/50* (2013.01)

(56) References Cited

U.S. PATENT DOCUMENTS

| | | | |
|---|---|---|---|
| 2004/0113265 A1* | 6/2004 | DiBattista et al. | 257/714 |
| 2005/0064257 A1 | 3/2005 | Isoda et al. | |
| 2006/0263651 A1* | 11/2006 | Fagley et al. | 429/13 |
| 2008/0032168 A1 | 2/2008 | Fujita | |
| 2012/0107710 A1 | 5/2012 | Drouhault et al. | |
| 2014/0017581 A1 | 1/2014 | Drouhault et al. | |
| 2014/0045088 A1 | 2/2014 | Drouhault et al. | |

FOREIGN PATENT DOCUMENTS

| | | |
|---|---|---|
| CN | 1484334 A | 3/2004 |
| CN | 1582511 A | 2/2005 |
| CN | 1689183 A | 10/2005 |
| CN | 101127407 A | 2/2008 |
| EP | 1 519 436 | 3/2005 |

OTHER PUBLICATIONS

French Preliminary Search Report issued Jan. 18, 2012, in French Patent Application No. 1154607 with English Translation of category of cited documents.

Combined Chinese Office Action and Search Report issued Jul. 2, 2015 in Patent Application No. 201280025662.3 (with partial English language translation and English translation of categories of cited documents).

* cited by examiner

FUEL CELL WITH IMPROVED THERMAL MANAGEMENT

TECHNICAL FIELD AND PRIOR ART

The present invention relates to a fuel cell with improved heat management.

A fuel cell, to deliver electricity, is supplied with fuel gas, for example hydrogen in the case of a cell of the proton exchange membrane fuel cell (PEMFC) type, and in oxidizing gas, for example air or oxygen.

The operation of the fuel cell also results in generating heat energy.

A fuel cell comprises a stack of electrochemical cells, each cell comprising an anode and a cathode. The cells are kept compressed against each other by end plates connected by tie rods.

A circuit is provided to supply reactive gases in cells. On the other hand, the electrochemical efficiency of the fuel cell is dependent on the temperature within the cell because of the very nature of the materials used. Consequently, this temperature should be monitored in order not to exceed 80° C. and to obtain the highest possible efficiency. Indeed, if the operating temperature is too low, the best operating efficiency of the fuel cell cannot be achieved, and if the fuel cell undergoes too high a temperature rise, the materials making up the fuel cell can be damaged. The optimum temperature range is 65° C. to 75° C.

As previously explained, the fuel cell generates heat during operation thereof. This heat should be generally removed to restrict the temperature rise within the fuel cell. For that purpose, a heat management circuit is provided to flow a coolant through the cells. The circuit comprises a first part passing through the stack of cells, called inside circuit and a part outside the stack, called outside circuit. The flow rate and temperature of the coolant are controlled. The outside circuit comprises two subcircuits, a subcircuit provided with a heat exchanger in order to cool the coolant and a subcircuit directly bringing the coolant back into the inlet of the inside circuit wherein the coolant is not or hardly cooled.

When the temperature of the coolant is higher than a given threshold, all or part of the coolant is sent into the subcircuit provided with the heat exchanger in order to be cooled by passing through the heat exchanger.

In order to manage the temperature of the fuel cell, valves are directly implanted at the outlet of each cell and are controlled as a function of the coolant temperature. In the case of a PEMFC fuel cell: when the fluid has a temperature higher than 75° C., the entire fluid is directed towards the first cooling subcircuit comprising a heat exchanger. When the fluid reaches a temperature between 65° C. and 75° C., part of this fluid is deviated to the second subcircuit directly bringing the coolant back into the inlet of the inside circuit and the first short-circuit provided with the heat exchanger, the short-circuited fraction being all the greater that the temperature is close to 65° C. For fluid temperatures lower than 65° C., the entire flow rate is directly short-circuited towards the inlet of the stacks.

On cells having high electric powers, in the order of a few tens of kW, several stacks of bipolar plates hydraulically connected in parallel are made to restrict the overall height space and restrict head losses in the distribution of the coolant, oxidizing and fuel fluids, as well as to lower the electrical voltage level of the cell.

In the case of a cell comprising at least a first and a second stack supplied with coolant in parallel, each stack being equipped with a valve in order to control its temperature, if the first stack warms up more quickly than the second one, the valve opens to the first cooling subcircuit provided with the heat exchanger. But the head loss increases because of the passage through the heat exchanger. Consequently, the flow rate of coolant in the first stack decreases, which reduces heat removed from the first stack. However, since the total flow rate provided by the pump remains identical, the flow rate in the second coolant increases, which causes an increase in the heat exchange in the second stack, and thus a decrease in the temperature of the second stack. The first stack, which was initially hot, further heats up and the second stack, which was initially cooler, is further cooled. Then, there occurs an amplification of the heat imbalance between both stacks, which can compromise the integrity of the electrochemical membranes of the hottest stack.

DISCLOSURE OF THE INVENTION

It is therefore an goal of the present invention to provide a fuel cell comprising at least two stacks of cells wherein a heat imbalance between the stacks is avoided, or at least reduced.

The goal of the present invention is achieved by a fuel cell comprising at least two stacks of cells and a heat management system comprising an inside circuit for flowing a coolant into the stack, and an outside circuit, formed by a first subcircuit provided with a heat exchanger and a second subcircuit directly bringing the coolant back into the inlet of the inside circuit through which a coolant circuit passes and valves located at the outlet of the inside subcircuits and controlling the flow of the coolant in either or both outside subcircuits. The cell also comprises means for ensuring a close or equal head loss between both outside subcircuits.

By "close or equal head losses" in the present application, it is meant head losses whose deviation related to a head loss target value is 20% at most, which efficiently enables an imbalance between both stacks to be avoided.

Advantageously, the head loss is increased in the second outside subcircuit. For this, the flow in the second subcircuit is deteriorated, however surprisingly, this deteriorated flow has a favourable effect on the general operation of the cell.

Preferably, means for increasing this head loss are provided in the valves at the connection to the second outside subcircuit. For example, it is a diaphragm reducing the coolant flow cross-section.

Very advantageously, the valves are thermostatic valves, which simplifies the heat management of the cell.

Also very advantageously, each valve of a stack is located in one of the end plates of the stack, which enables the axial overall space of the cell to be reduced.

The subject-matter of the present invention is therefore a fuel cell comprising at least two stacks of electrochemical cells and end plates applying a tightening strain to the stacks of electrochemical cells, a heat management system formed by a circuit for flowing a coolant into each of the stacks, called the inside circuit, both stacks being connected in parallel, and by a circuit for flowing the coolant outside the stacks, called the outside circuit, the outside circuit comprising a first subcircuit provided with a heat exchanger and a second subcircuit directly connected to the inlet of the inside circuit, devices for controlling the flow of the coolant to either or both subcircuits as a function of the temperature of said coolant at the output of each of the stacks, said heat management system comprising means for ensuring that the first outside subcircuit and the second outside subcircuit have close or identical head losses.

Preferably, the means for generating a head loss close or equal to that generated by the heat exchanger in the first outside subcircuit are provided in the second outside subcircuit.

Preferably, each stack comprises means for generating a head loss.

Advantageously, the means for generating a head loss are provided in the controlling devices.

In a particularly advantageous example, the means for generating a head loss are formed by a reduced cross-section passage section forming a diaphragm. The reduced cross-section passage section can be made as one piece with a tip for connecting at least one controlling device to the second outside subcircuit. Alternatively, the reduced cross-section passage section can be formed by a drilled plate mounted in at least one controlling device.

Advantageously, at least one of the controlling devices is integrated in an end plate.

Preferably, at least one of the controlling devices is a thermostatic valve.

The fuel cell is for example a PEMFC cell.

A subject-matter of the present invention is also a method for making a fuel cell according to the invention, comprising the steps of:

a) determining the head loss generated by the heat exchanger;

b) modifying the first and/or second outside subcircuit for the head losses in both subcircuits to be close or identical.

Step b) can comprise the substep of selecting means to be introduced in the second subcircuit to generate a head loss close or identical to that of the heat exchanger. During step b), for example the dimensions of the diaphragm are determined.

BRIEF DESCRIPTION OF THE DRAWINGS

The present invention will be better understood using the following description and the appending drawings wherein.

DETAILED DISCLOSURE OF PARTICULAR EMBODIMENTS

Figure 1:
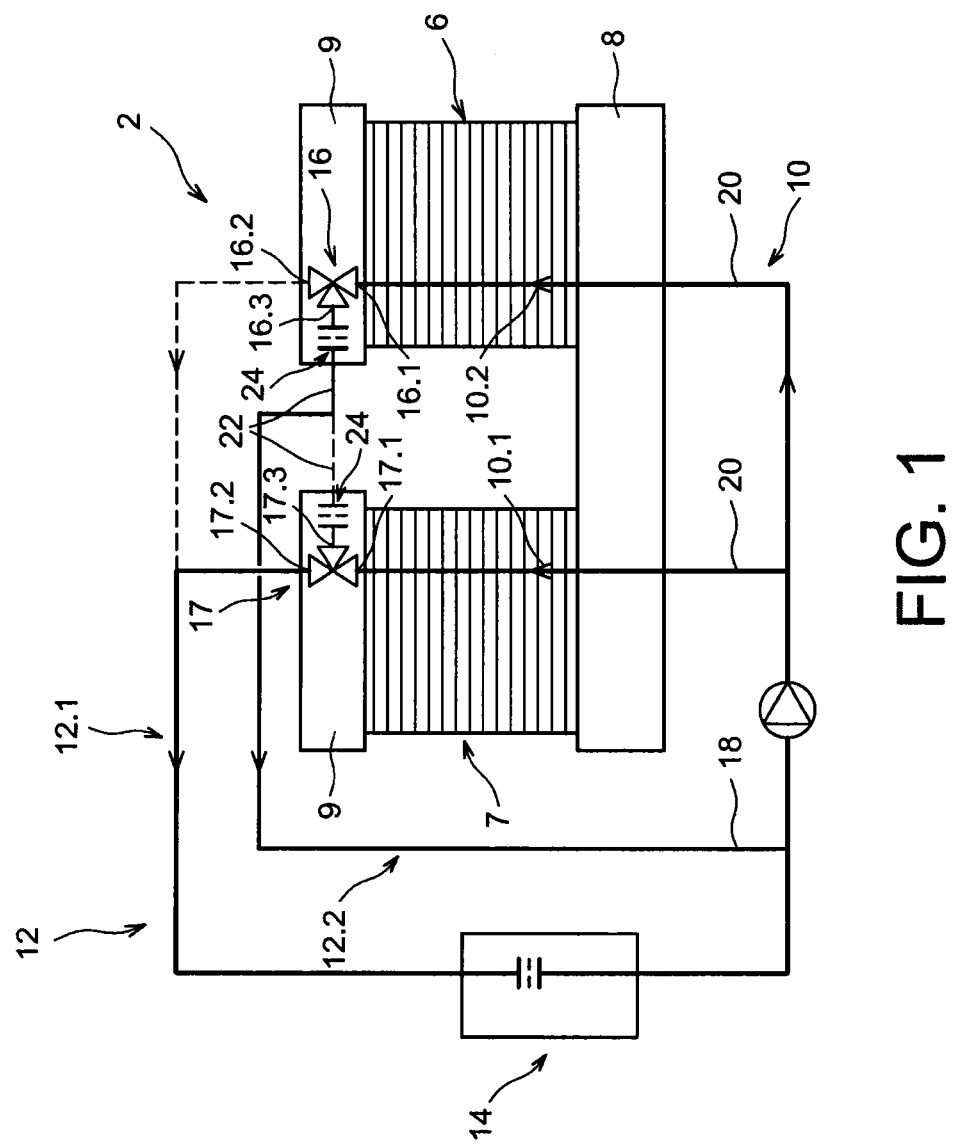
FIG. 1 is a schematic representation of a cell according to the present invention wherein the circuits for flowing the coolant are represented.

In FIG. 1, there can be seen a schematic representation of a fuel cell 2 equipped with a heat control system 4.

The fuel cell 2 comprises two stacks 6, 7 of electrochemical cells comprised of bipolar plates and ion exchange membranes alternately provided, and downstream 8 and upstream 9 end plates on either side of the stacks.

The end plates 8, 9 exert a compressive strain onto the stacks 6, 7 to ensure an electrical conduction evenly distributed throughout the surface of the elements making up the cells. In the example represented, the cell comprises an upstream end plate common to both stacks, but they could be separated. The downstream end plates could also be replaced by a common plate.

Besides, the supply of cells with reactive fluid, for example hydrogen on the one hand and oxygen on the other hand, is made through either or both end plates 8, 9. The end plate(s) comprise(s) supply and discharge ports connected both to a circuit within the stacks, and to a supply and recovery circuit (not represented). The tightening strain applied to the end plates 8, 9 also ensures a good tightness to reactive gases.

The heat control system 4 comprises a circuit for flowing the coolant a part 10 of which allows a flow within the stacks 6, 7 and another part 12 of which allows a flow outside the stacks 6, 7.

The flow circuits pass through the end plates 8, 9.

The part 10 of the flow circuit within the stacks 6, 7, called inside circuit, is for example directly made in the cells.

The tightening strain applied by the end plates 8, 9 also ensures a good tightness to the coolant.

The flow circuit comprises a flow pump P to ensure the flow of coolant into the stacks and outside them.

The inside circuit 10 comprises two inside subcircuits 10.1, 10.2, each passing through a stack, fed in parallel by the pump P.

The part 12 of the circuit outside the stacks, called outside circuit 12, comprises two flow subcircuits 12.1, 12.2. The first subcircuit 12.1 comprises a heat exchanger 14 to enable the coolant to exchange heat with the outside environment, for example to give off heat to the outside. But it could be contemplated that it takes up heat from the outside environment.

The second subcircuit 12.2 is intended to allow a flow of coolant back into the stacks without passing through the exchanger. This second subcircuit 12.2 is thus hydraulically connected in parallel with the first subcircuit 12.1 and enables the fluid flow to be avoided in the first subcircuit 12.1.

The coolant flow in either of the subcircuits 12.1, 12.2 is achieved by means of controlling devices such as three-way valves 16, 17.

The first stack is connected to the first subcircuit and to the second subcircuit through the three-way valve 16 and the second stack is connected to the first subcircuit and to the second subcircuit through the three-way valve 17.

The second subcircuit comprises a common flow portion 18 wherein the coolants of both stacks are mixed and upstream 20 and downstream 22 portions connecting each of the inside circuits of the stacks to the common portion 18.

Each controlling valve 16, 17 comprises an inlet 16.1, 17.1 connected to the outlet of the outside circuit 10 and two outlets 16.2, 16.3, 17.2, 17.3 connected to the inlets of the subcircuits 12.1, 12.2 and ensures the passage of all or part of the coolant fluid in either of the subcircuits 12.1, 12.2.

The three-way valves 16, 17 are controlled as a function of the temperature of the coolant passing through the stacks. The coolant flowing in either of the stacks is sent into the first and/or second subcircuits depending on its temperature.

For example, the controlling valves 16, 17 can be three-way valves slaved to a temperature measurement of the coolant fluid, for example by means of a temperature probe dipped into the coolant fluid and an electronic unit controlling the state of the valves.

Particularly advantageously, the controlling valves 16, 17 are thermostatic valves the state of which is directly controlled by the coolant fluid, more particularly the coolant fluid temperature, without requiring further means, for example of the electronic type. It is reminded that a thermostatic valve is a valve comprising an element having a high expansion coefficient which expands or contracts depending on the temperature of the fluid surrounding it by relieving or obstructing coolant fluid passage ports. In the particular case of a three-way valve, the element having a high expansion coefficient either completely obstructs one of the three ways, or partially two of the three ways. Besides increased reliability and robustness of controlling the valve, a further saving of space is achieved.

Also very advantageously, one or both controlling valves 16, 17 is/are provided inside the downstream end plate(s) 9. This integration enables the overall space of the heat control system to be reduced. Indeed, the end plates have generally some thickness in order to ensure the tightening of the cells.

The heat management circuit comprises means 24 ensuring that the head loss of the first subcircuit and that of the second subcircuit are close or equal. It is attempted that the values of head loss in both subcircuits as close as possible, i.e. that a deviation between the two head losses related to the target value is equal to or lower than 20%.

Preferentially, the second subcircuit comprises means 24 for increasing its head loss such that its head loss is close or equal to that of the first outside subcircuit, the head loss of the first outside subcircuit being mostly due to the heat exchanger.

Preferably, these means can be a diaphragm forming an abrupt narrowing immediately followed by an abrupt widening, in 1 or 2 mm flow in the second outside subcircuit, i.e. a circular hole made in a plate having a low thickness, with a reduced diameter with respect to that of the duct wherein it is installed. The diaphragm has the advantage of being able to be easily integrated and its sizing is well known to the literature in the field of flows. Furthermore, a diaphragm is very compact.

Generally, any means increasing fluid friction on the walls which surround it can be suitable for forming the means 24 for increasing the head loss. Consequently, any means able to create a head loss is likely to be suitable whether it is a cross-section change (for example a throttle or an abrupt enlargement of the passage cross-section), a change of direction (for example as short as possible bends), or a great length of piping.

Preferably, this passage throttle is directly formed in the outlet of the control valves to the second outside subcircuit, thus simplifying the manufacture of the cell.

Figure 2A:
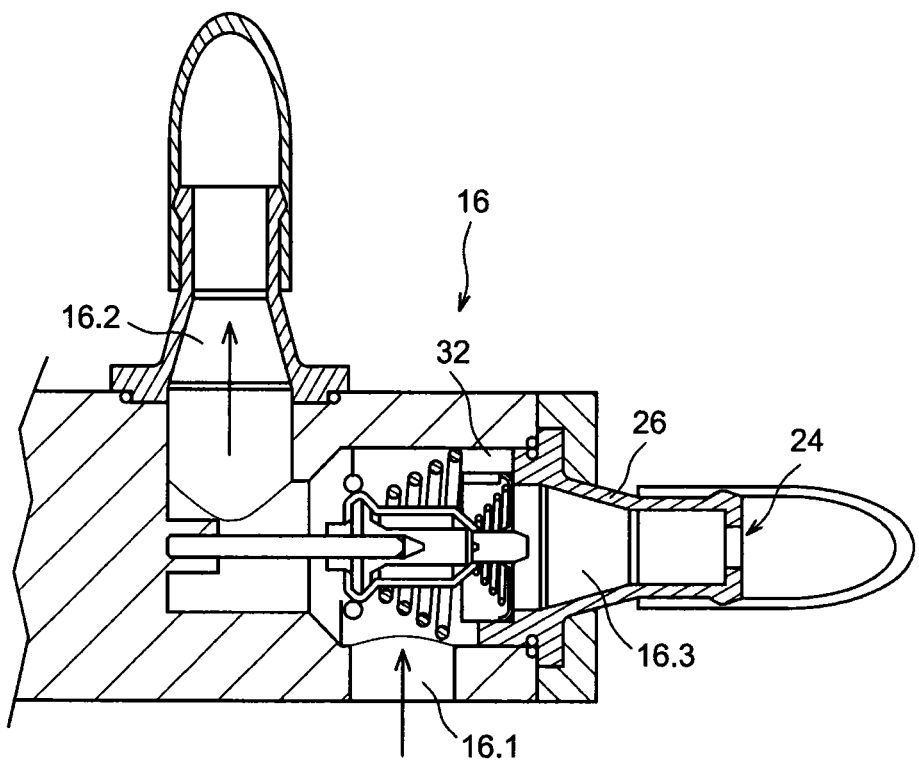
FIGS. 2A and 2B are cross-section views of an embodiment of a thermostatic valve that can be implemented in the cell of the present invention in two different states.
Figure 2B:
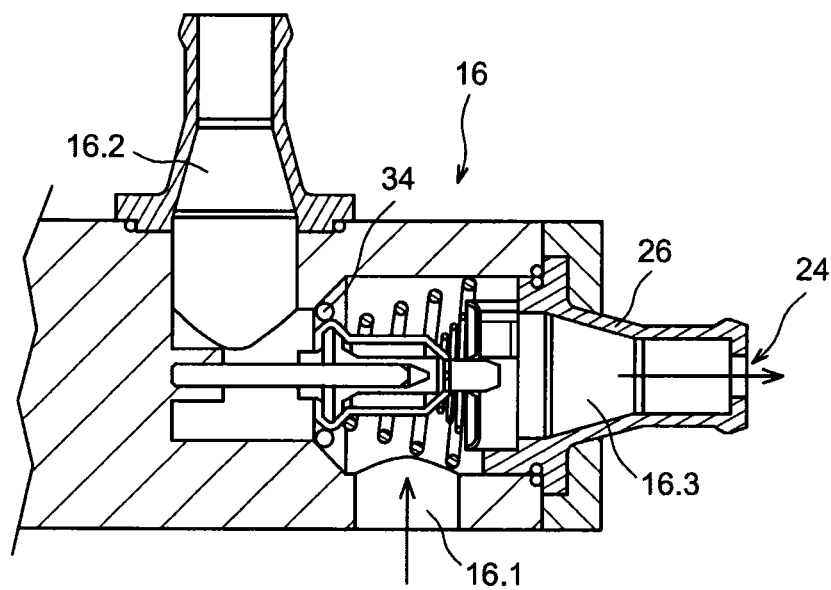

In FIGS. 2A and 2B, an advantageous exemplary embodiment of a thermostatic valve 16 comprising such a reduced cross-section passage section 24 can be seen. In this example, the reduced cross-section passage section 24 is formed at the end of the tip 26 for connecting the outlet of the valve to the second outside subcircuit 12.2. This reduced cross-section is formed as a single piece with the tip 26. This exemplary embodiment has the advantage not to require a further part, the addition of this reduced cross-section has therefore no incidence on mounting the control valve and its placement into the circuit.

In FIG. 2A, the thermostatic valve ensures the coolant flow only to the first outside subcircuit provided with the heat exchanger, a seal 32 closing the passage to the first outside subcircuit 12.1. The coolant has then a temperature higher than a given threshold, for example in the order of 75° C. in the case of a PEMFC type fuel cell.

In FIG. 2B, the thermostatic valve ensures the coolant flow only to the second outside subcircuit 12.2, a seal 34 closing the passage to the second subcircuit. The coolant then has a temperature lower than a given threshold, for example in the order of 65° C. in the case of a PEMFC type fuel cell.

Figure 3:
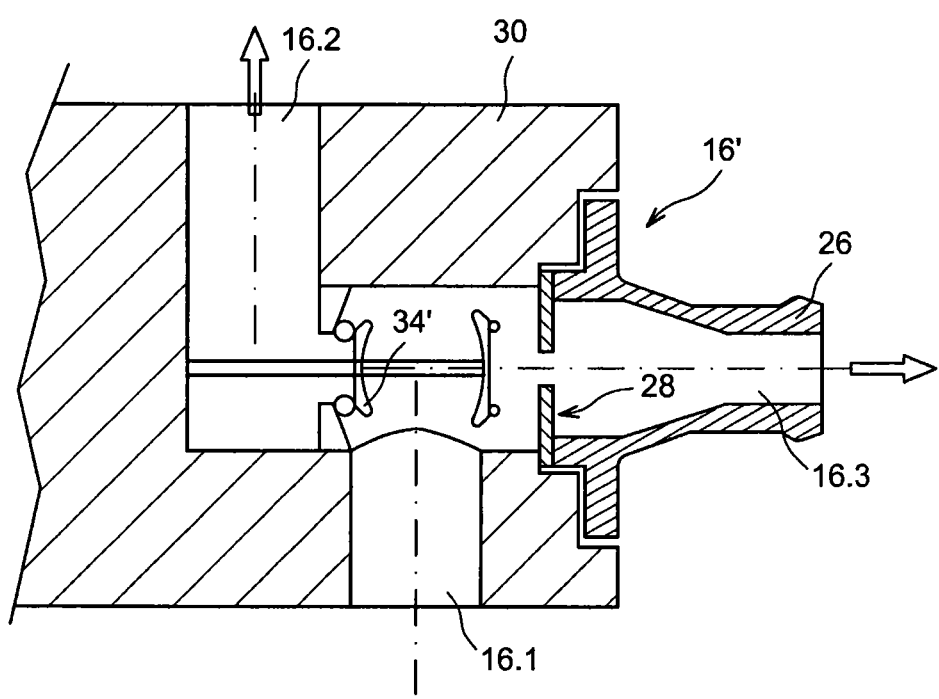
FIG. 3 is a cross-section view of another exemplary embodiment of a thermostatic valve that can be implemented in the cell of the present invention.

In FIG. 3, another exemplary embodiment of a control valve 16' wherein the reduced cross-section passage section is achieved by adding a drilled plate 28 inside the valve can be seen. For example, the washer 28 is introduced upstream of the outlet connector of the valve to the second subcircuit. Advantageously, the drilled plate 28 is clamped between the body 30 of the valve and the connecting tip 26, which allows a relatively simple support. The valve 16', represented in FIG. 3, is in a state of sealing the flow to the first outside subcircuit 12.1, by a seal 34'.

The arrangement of the means ensuring the head loss in the control valve is in no way restricting, it can be contemplated that they are provided in both downstream portions of the second outside subcircuit, in both upstream portions of the second outside subcircuit, one in an upstream portion of a stack and the other in the downstream portion of the other stack.

Further, the means generating the head loss in the valves are not necessarily identical for both stacks.

In the cell schematically represented in FIG. 1, the control valves are integrated in the downstream end plate, which enables the overall space of the cell to be reduced. Furthermore, the head loss means are directly made in the valves, which enables the overall space to be further reduced. Moreover, in the case of thermostatic valves, the heat management of the cell is automatic, particularly simple and requires neither control nor outside measurement.

The operation of the cell according to the invention will now be described briefly.

During an operation of the cell, the coolant flows into both stacks in the cell in order to extract therefrom heat generated by the operation of the cells. The coolant flows in the inside circuit and is directed to the first outside subcircuit 12.1 and/or to the second outside subcircuit 12.2 by the control valves 16, 17 as a function of the temperature of each of the coolants flowing in each of the stacks 6, 7.

For example, if the temperature of the coolant coming out of a stack is lower than 65° C., the coolant is sent into the second subcircuit 12.2 to be directly sent back into the stacks without giving off heat via the heat exchanger 14. If the temperature of the coolant in the first stack 6 is higher than 75° C., the control valve 16 sends the entire coolant into the first outside subcircuit 12.1 so that it can be cooled.

When the coolant has a temperature between 65° C. and 75° C., the control valve 16 sends part of the coolant into the first outside subcircuit 12.1 and the other part of the coolant into the second outside subcircuit 12.2.

Let us consider the case where the first stack 6 warms up more than the second stack 7 and where the temperature of the coolant coming out of the first stack 6 is higher than 75° C. and the temperature of the coolant coming out of the second stack 7 is lower than 65° C. The first valve 16 sends the entire coolant coming out of the first stack 6 into the first outside subcircuit 12.1 provided with the heat exchanger 17, the second valve 17 sends the coolant coming out of the second stack 7 into the second outside subcircuit 12.2. The first subcircuit 12.1 experiences some head loss due to the presence of the heat exchanger 14 and the second subcircuit 12.2 experiences some head loss due to the diaphragm 24, the diaphragm 24 is selected such that both head losses are close, or even identical. The coolant flow rates in both subcircuits 12.1, 12.2 are then very close, or even identical, the amounts of coolant flowing into both stacks 6, 7 are then substantially identical, which ensures a balanced cooling between both stacks 6, 7.

An exemplary method for making a heat management circuit according to the invention will now be described.

The manufacturing method comprises a step of determining the head loss to be caused in the second outside subcircuit.

The case where the head loss to be caused is obtained by means of a diaphragm is considered.

The head loss of the first outside subcircuit provided with the exchanger is first determined. This head loss can be divided into two parts: a so-called "singular" part, corresponding to the resistance of the fluid passage caused by all the "geometrical" changes in the fluid passage cross-section, and a so-called "regular" part corresponding to the frictions along the walls of the passage cross-sections.

Both these head loss coefficients (regular and singular) enable identical head losses to be obtained in the outside subcircuits of the circuit.

The head loss can be written as:

$$DP = (k_{reg} + K_{sing}) \cdot V^2$$

The singular head loss to be added at the outlet of the control valve to the second subcircuit can be calculated the following way:

$$\Delta H = \left(\frac{S_{upstream}}{S_{diaphragm}} - 1\right)^2 \cdot \frac{V_{upstream}}{2g}$$

Where $S_{upstream}$ represents the fluid passage cross-section upstream of the diaphragm, $S_{diaphragm}$, the diaphragm passage cross-section, $V_{upstream}$, the fluid rate upstream of the diaphragm, g, the acceleration of gravity, and $\Delta H$, the head loss brought about by the diaphragm (in metres of Water Column mWC).

In the case of a fuel cell having a power of about 15 kW, the coolant flow of which, for example glycoled water, is equal to about 7 kg/s.

The head loss to be generated is 150 mbar for a fluid flow rate of 2.5 m3/h.

For the calculation, it is determined that the diaphragm to be used to generate such a head loss has a diameter of 6.9 mm, for an upstream diameter of 22.6 mm.

Alternatively, it can be contemplated to decrease the head loss in the first subcircuit by pressurizing it, for example by integrating a pump type device . . . . It can also be contemplated to increase the head loss in the second subcircuit and to decrease it in the first subcircuit.

The present invention is applicable to cells comprising more than two stacks.

By virtue of the invention, the non heat imbalance between different stacks in parallel of the cell is ensured, in a very simple way and without causing an increase in the overall space of the heat management system and thus of the cell.

The invention claimed is:

1. A fuel cell, comprising:
   at least two stacks of electrochemical cells and end plates configured to apply a tightening strain to the at least two stacks of electrochemical cells; and
   a heat management system including an inside circuit configured for flowing a coolant into each of the at least two stacks, both of the at least two stacks being connected in parallel, and an outside circuit configured for flowing the coolant outside the at least two stacks,
   the outside circuit comprising a first subcircuit including a heat exchanger and a second subcircuit directly connected to an inlet of the inside circuit, and devices configured to control flow of the coolant to either or both of the first and second subcircuits as a function of temperature of the coolant at an output of each stack of the at least two stacks, and
   the heat management system further including a device configured to ensure that head losses of the first outside subcircuit and the second outside subcircuit have a deviation of 20% or less compared to a predetermined value.

2. The fuel cell according to claim 1, wherein the device configured to ensure that head losses of the first outside subcircuit and the second outside subcircuit have the deviation of 20% or less compared to the predetermined value, further comprises a generator, provided in the second outside subcircuit, of a head loss within the deviation of 20% or less than that generated by the heat ex hanger in the first outside subcircuit.

3. The fuel cell according to claim 2, wherein each stack of the at least two stacks comprises a head loss generator.

4. The fuel cell according to claim 3, wherein the head loss generator in said each stack is provided in the devices configured to control flow of the coolant.

5. The fuel cell according to claim 3, wherein the head generator in said each stack is formed by a reduced cross-section passage section forming a diaphragm.

6. The fuel cell according to claim 4, wherein the head loss generator in said each stack is formed by a reduced cross-section passage section forming a diaphragm.

7. The fuel cell according to claim 5, wherein the reduced cross-section passage section is one piece with a tip configured to connect the second outside subcircuit to at least one device configured to control flow of coolant.

8. The fuel cell according to claim 5, wherein the reduced cross-section passage section is a drilled plate mounted in at least one device configured to control flow of coolant.

9. The fuel cell according to claim 1, wherein at least one of the devices configured to control flow of coolant is integrated in an end plate.

10. The fuel cell according to claim 1, wherein at least one of the devices configured to control flow of coolant is a thermostatic valve.

11. The fuel cell according to claim 1, being a proton exchange membrane fuel cell(PEMFC).

12. A method for optimizing operation of a fuel cell
   the fuel cell comprising:
      at least two stacks of electrochemical cells and end plates configured to apply a tightening strain to the at least two stacks of electrochemical cells; and
      a heat management system including an inside circuit configured for flowing a coolant into each of the at least two stacks, both of the at least two stacks being connected in parallel, and an outside circuit configured for flowing the coolant outside the at least two stacks, and
      the outside circuit comprising a first subcircuit including a heat exchanger and a second subcircuit directly connected to an inlet of the inside circuit, and devices configured to control flow of the coolant to either or both of the first and second subcircuits as a function of temperature of the coolant at an output of each stack of the at least two stacks;
   the method comprising:
   a) determining head loss generated by the heat exchanger; and
   b) modifying, by the heat management system at least one of the first outside subcircuit and the second outside subcircuit so that the head losses of the first and second subcircuits deviate by 20% or less compared to a predetermined value.

13. The method for optimizing operation of the fuel cell according to claim 12, wherein the b) modifying comprises introducing a selecting means in the second subcircuit to generate a head loss substantially identical to that of the heat exchanger.

14. The method for optimizing operation of the fuel cell according to claim 13, wherein during the b) modifying, dimensions of a diaphragm are determined.

* * * * *